(12) United States Patent
Rumpler et al.

(10) Patent No.: US 11,188,495 B2
(45) Date of Patent: Nov. 30, 2021

(54) SPI BROADCAST MODE

(71) Applicant: Infineon Technologies AG, Neubiberg (DE)

(72) Inventors: Christoph Rumpler, Munich (DE); Reinhard-Wolfgang Jungmaier, Alkoven (AT); Dennis Noppeney, Cologne (DE); Saverio Trotta, Munich (DE)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 16/779,126

(22) Filed: Jan. 31, 2020

(65) Prior Publication Data
US 2021/0240656 A1 Aug. 5, 2021

(51) Int. Cl.
*G06F 13/42* (2006.01)
*G06F 9/4401* (2018.01)
*G06F 9/30* (2018.01)
*G06F 13/362* (2006.01)

(52) U.S. Cl.
CPC ........ *G06F 13/4282* (2013.01); *G06F 9/3012* (2013.01); *G06F 9/4411* (2013.01); *G06F 13/362* (2013.01)

(58) Field of Classification Search
CPC .. G06F 13/4282; G06F 9/4411; G06F 9/3012; G06F 13/362
USPC ...................... 710/32, 33, 36, 110
See application file for complete search history.

(56) References Cited

U.S. PATENT DOCUMENTS

| | | | | |
|---|---|---|---|---|
| 9,734,099 | B1* | 8/2017 | Argoetti | G06F 13/1689 |
| 10,684,974 | B1* | 6/2020 | Wright | G06F 13/4022 |
| 2003/0154336 | A1* | 8/2003 | Ballantyne | G06F 13/385 |
| | | | | 710/110 |
| 2008/0183928 | A1* | 7/2008 | Devila | G06F 13/4291 |
| | | | | 710/110 |
| 2009/0022255 | A1 | 1/2009 | Kanekawa et al. | |
| 2012/0072628 | A1* | 3/2012 | Crockett | G06F 13/4291 |
| | | | | 710/110 |
| 2012/0131247 | A1* | 5/2012 | Mok | G06F 13/4291 |
| | | | | 710/110 |
| 2013/0278312 | A1* | 10/2013 | Getzin | G06F 1/12 |
| | | | | 327/160 |
| 2016/0187464 | A1* | 6/2016 | Ginsburg | G01S 7/4008 |
| | | | | 342/168 |
| 2017/0083467 | A1* | 3/2017 | Mishra | G06F 13/362 |

(Continued)

OTHER PUBLICATIONS

Microsemi, "CoreSPI v5.0", Handbook, Microsemi Corporate Headquarters, Aliso Viejo, CA, Feb. 2015, 34 pages.

(Continued)

*Primary Examiner* — Farley Abad
*Assistant Examiner* — Henry W Yu
(74) *Attorney, Agent, or Firm* — Slater Matsil, LLP (57) ABSTRACT

In an embodiment, a method for writing to a set of serial peripheral interface (SPI) slaves coupled to an SPI bus includes: disabling master in slave out (MISO) drivers of the set of SPI slaves using the SPI bus; after disabling the MISO drivers, setting respective slave selection terminals of the set of SPI slaves to an active state; and after setting the respective slave selection terminals of the set of SPI slaves to the active state, simultaneously writing data to the set of SPI slaves using a master out slave in (MOSI) line.

23 Claims, 4 Drawing Sheets

(56) References Cited

U.S. PATENT DOCUMENTS

2017/0091139 A1* 3/2017 Edwards .................. G06F 13/24
2019/0129880 A1* 5/2019 Zhu ..................... G06F 13/4282

OTHER PUBLICATIONS

Texas Instruments, "Keystone Architecture Serial Peripheral Interface (SPI)", User Guide, Literature No. SPRUGP2A, Mar. 2012, 51 pages.

Texas Instruments, "TMS320x281x Serial Peripheral Interface", Reference Guide, Literature No. SPRU059E, Jun. 2002-Feb. 2009, 40 pages.

Texas Instruments, "TMS320x28xx, 28xxx DSP, Serial Peripheral Interface (SPI)", Reference Guide, Literature No. SPRU059D, Jun. 2002-Nov. 2006, 60 pages.

* cited by examiner

PRIOR ART

FIG. 1

PRIOR ART

FIG. 3

PRIOR ART

SPI BROADCAST MODE

TECHNICAL FIELD

The present disclosure relates generally to an electronic system and method, and, in particular embodiments, to a serial peripheral interface (SPI) broadcast mode.

BACKGROUND

There are different communication interfaces that can be used to establish communication between devices. One of these communication interfaces is called SPI.

Figure 1:
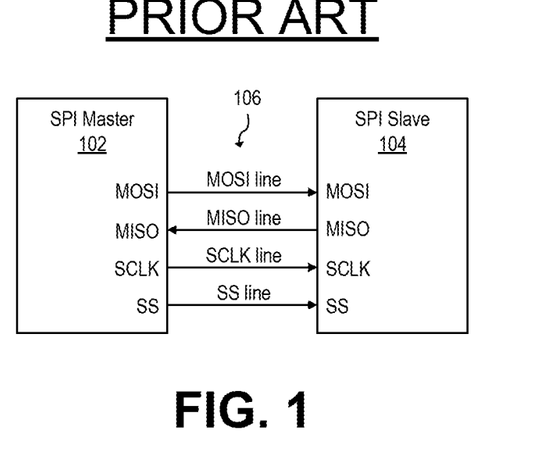
FIGS. 1 and 2 show schematic diagrams of exemplary SPI buses between an SPI master and SPI slave devices.

Devices implementing SPI can communicate with other devices implementing SPI using a (shared) communication bus that uses a master-slave architecture. FIG. 1 shows exemplary SPI master 102 and exemplary SPI slave 104 communicating via SPI bus 106.

During normal operation, SPI master 102 asserts (sets to the active state) the slave select (SS) pin (e.g., with a logic 1 in this case) to select the SPI slave having its SS pin connected to the SS line (in this case SPI slave 104). Master device 102 then generates a SPI clock signal at serial clock (SCLK) pin at a frequency supported by SPI slave 104.

During each SPI clock cycle of data transmission, SPI master 102 transmits data to the selected SPI slave (in this case SPI slave 104) using the master out slave in (MOSI) pin (connected to the MOSI line) and receives data from the selected SPI slave at the master in slave out (MISO) pin (connected to the MISO line) in synchrony with the SPI clock signal. Correspondingly, SPI slave 104 receives data from SPI master 102 at the MOSI pin and transmits data to SPI master 102 using the MISO pin in synchrony with the SPI clock signal.

Figure 2:
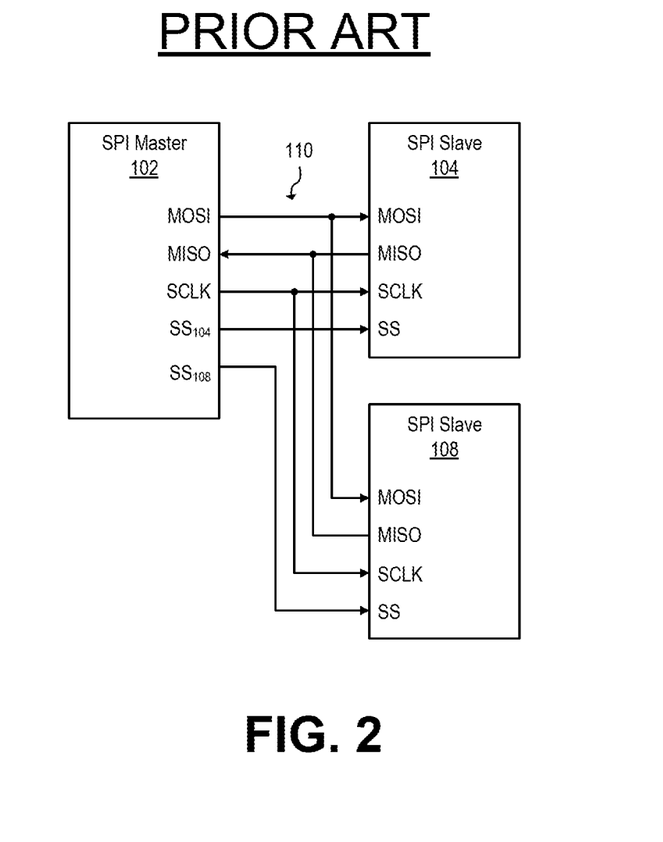

FIG. 2 shows exemplary SPI bus no being shared with more than one SPI slave. As show in FIG. 2, the MOSI, MISO, and SCLK lines are shared among SPI slaves 104 and 108. However, a dedicated SS line is used by SPI master 102 to select which SPI slave is active for SPI communication to avoid conflicts in the MISO line.

For example, if two SPI slaves (e.g., 104 and 108) are simultaneously transmitting different data (e.g., logic 1 and logic 0) in the MISO line, the MISO line will be simultaneously pulled high and low, thereby causing an SPI bus error. To avoid such scenario, when the SS pin of a slave device is deasserted (set to the inactive state—e.g., with a logic 0 in the example shown in FIGS. 1 and 2), such slave device ignores any data received in its MOSI pin and does not transmit any data with its MISO pin. Therefore, in the example of FIG. 2, SPI master 102 can assert $SS_{104}$ and deassert $SS_{108}$ to communicate with SPI slave 104, and can assert $SS_{108}$ and deassert $SS_{104}$ to communicate with SPI slave 108.

SUMMARY

In accordance with an embodiment, a method for writing to a set of SPI slaves coupled to an SPI bus includes: disabling MISO drivers of the set of SPI slaves using the SPI bus; after disabling the MISO drivers, setting respective slave selection terminals of the set of SPI slaves to an active state; and after setting the respective slave selection terminals of the set of SPI slaves to the active state, simultaneously writing data to the set of SPI slaves using a MOSI line.

In accordance with an embodiment, a system includes an SPI bus, an SPI master, a first SPI slave, and a second SPI slave. The SPI bus includes a MOSI line, and a MISO line. The SPI master incudes a MOSI terminal coupled to the MOSI line, a MISO terminal coupled to the MISO line, a first slave selection terminal, and a second slave selection terminal. The first SPI slave includes a MOSI terminal coupled to the MOSI line, a MISO terminal coupled to the MISO line, a first MISO driver having an output coupled to the MISO terminal of the first SPI slave, and a first slave selection terminal coupled to the first slave selection terminal of the SPI master. The second SPI slave includes a MOSI terminal coupled to the MOSI line, a MISO terminal coupled to the MISO line, a second MISO driver having an output coupled to the MISO terminal of the second SPI slave, and a second slave selection terminal coupled to the second slave selection terminal of the SPI master. The SPI master is configured to: disable the first and second MISO drivers using the SPI bus; after disabling the first and second MISO drivers, set the first and second slave selection terminals of the SPI master to an active state; and after setting the first and second slave selection terminals of the SPI master to an active state, simultaneously write data to the first and second SPI slaves using the MOSI line.

In accordance with an embodiment, a system includes an SPI bus, an application processor, a first device, and a second device. The SPI bus includes a MOSI line, and a MISO line. The application processor includes an SPI master including a MOSI terminal coupled to the MOSI line, a MISO terminal coupled to the MISO line, a first slave selection terminal, and a second slave selection terminal. The first device has a first register bank and a first SPI slave that includes a MOSI terminal coupled to the MOSI line, a MISO terminal coupled to the MISO line, a first MISO driver having an output coupled to the MISO terminal of the first SPI slave, and a first slave selection terminal coupled to the first slave selection terminal of the SPI master. The second device has a second register bank and a second SPI slave that includes a MOSI terminal coupled to the MOSI line, a MISO terminal coupled to the MISO line, a second MISO driver having an output coupled to the MISO terminal of the second SPI slave, and a second slave selection terminal coupled to the second slave selection terminal of the SPI master. The application processor is configured to: disable the first and second MISO drivers using the SPI master, after disabling the first and second MISO drivers, set the first and second slave selection terminals of the SPI master to an active state, and after setting the first and second slave selection terminals of the SPI master to an active state, simultaneously write data to the first and register banks using via the SPI bus using the SPI master.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in different figures generally refer to corresponding parts unless otherwise indicated. The figures are drawn to clearly illustrate the relevant aspects of the preferred embodiments and are not necessarily drawn to scale.

DETAILED DESCRIPTION OF ILLUSTRATIVE EMBODIMENTS

The making and using of the embodiments disclosed are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The description below illustrates the various specific details to provide an in-depth understanding of several example embodiments according to the description. The embodiments may be obtained without one or more of the specific details, or with other methods, components, materials and the like. In other cases, known structures, materials or operations are not shown or described in detail so as not to obscure the different aspects of the embodiments. References to "an embodiment" in this description indicate that a particular configuration, structure or feature described in relation to the embodiment is included in at least one embodiment. Consequently, phrases such as "in one embodiment" that may appear at different points of the present description do not necessarily refer exactly to the same embodiment. Furthermore, specific formations, structures or features may be combined in any appropriate manner in one or more embodiments.

Embodiments of the present invention will be described in a specific context, a broadcast mode for SPI for, e.g., millimeter-wave devices. Embodiments of the present invention may be used in other SPI applications.

In an embodiment of the present invention, an SPI broadcast mode allows an SPI master to write the same data to a plurality of SPI slave devices simultaneously. In some embodiments, by writing to multiple SPI slaves in parallel, the SPI broadcast mode advantageously allows for faster configuration of multiple SPI slaves without the risk of causing an SPI bus error.

Figure 3:
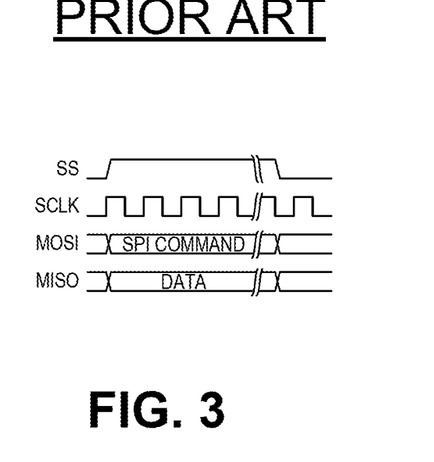
FIG. 3 shows exemplary waveforms of the SS, SCLK, MOSI and MISO lines of FIG. 1 during an exemplary SPI write command by the SPI master of FIG. 1 to the SPI slave of FIG. 1.

In conventional SPI communications (such as shown in FIGS. 1 and 2), every write access (from an SPI master to an SPI slave) is also a read access. In other words, each time SPI master 102 writes to SPI slave 104 via the MOSI line, SPI slave 104 transmits data to SPI master 102 via the MISO line. For example, FIG. 3 shows exemplary waveforms of the SS, SCLK, MOSI and MISO lines of FIG. 1 during an exemplary SPI write command by SPI master 102 to SPI slave 104.

Therefore, if SPI master 102 (in FIG. 2) simultaneously selects SPI slave 104 and SPI slave 108 (e.g., using $SS_{104}$ and $SS_{108}$ pins) to write via the MOSI line the same data to both SPI slaves, different content may be written by SPI slaves 104 and 108 into the MISO line, thereby potentially causing an SPI bus error.

Conventionally, SPI bus errors are avoided by SPI master 102 writing SPI slaves 104 and 108 sequentially rather than in parallel.

In an embodiment of the present invention, an SPI master simultaneously writes to a plurality of SPI slaves by configuring the plurality of SPI slaves to operate in SPI broadcast mode using the MOSI line. In SPI broadcast mode, the MISO driver of each of the SPI slaves is disabled. In an embodiment, the SPI master first sequentially configures (e.g., by sequentially asserting the respective SS pin and writing an SPI broadcast bit using an SPI write command via the MOSI line) each of the SPI slaves connected to the SPI bus to operate in SPI broadcast mode. Then, the SPI master asserts all SS pins of the SPI slaves connected to the SPI bus and writes, with all SS pins asserted, to all the SPI slaves in parallel. Optionally, the SPI broadcast mode is then disabled.

Figure 4:
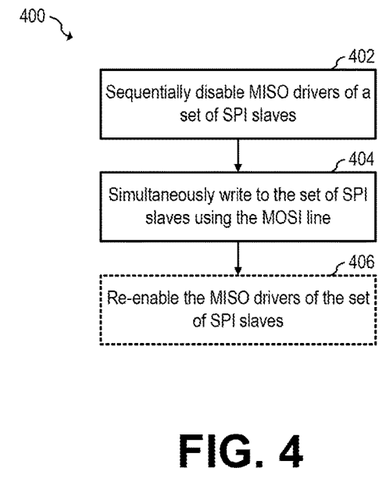
FIG. 4 shows a flow chart of an embodiment method for simultaneously writing to a plurality of SPI slaves using the MOSI line, according to an embodiment of the present invention.

FIG. 4 shows a flow chart of embodiment method 400 for simultaneously writing to a plurality of SPI slaves using the MOSI line, according to an embodiment of the present invention.

During step 402, an SPI master connected to an SPI bus sequentially disables the MISO drivers of a set of SPI slaves that are connected to the SPI bus (in other words, turning broadcast mode on). In some embodiments, the SPI master sequentially disables the MISO drivers of the SPI slaves by writing to a register of each of the SPI slaves using an SPI write command via the MOSI line of the SPI bus. For example, in some embodiments, the SPI broadcast mode is enabled sequentially issuing SPI write commands to each SPI slave of the set of SPI slaves to write assert an SPI broadcast mode bit.

During step 404, and after each of the SPI slaves of the set has broadcast mode enabled, the SPI master sets all of the dedicated SS lines of the SPI slave of the set to an active state (to select all the SPI slaves of the set for SPI communication). After all of the SS lines coupled to the set of SPI slaves are set to the active state, the SPI master simultaneously writes (e.g., using a conventional SPI write command) to all the SPI slaves of the set of SPI slaves the same data using the shared MOSI line. Since all the SPI slaves of the set of SPI slaves are selected (have their respective SS pin asserted), all get programmed with the same data. Since broadcast mode is on for all of the SPI slaves of the set (activated during step 402), none of the SPI slaves of the set attempts to transmit data via the MISO line. In some embodiments, any of the registers of the SPI slaves can be simultaneously written in SPI broadcast mode without risking an SPI bus error due to conflict in the MISO line.

During step 406, after the SPI slaves of the set have been simultaneously programmed, the MISO drivers of the set of SPI slaves are optionally re-enabled. For example, in some embodiments, the SPI master re-enables all of the MISO drivers via an SPI write command. In some embodiments, the command to turn broadcast mode off is transmitted simultaneously to all the SPI slaves of the set of SPI slaves using the broadcast mode. In some embodiments, the SPI broadcast mode is disabled by sequentially writing to each of the SPI slaves of the set to deassert the SPI broadcast mode bit. In some embodiments, the SPI broadcast mode is disabled automatically at the end the SPI broadcast command.

In some embodiments, the broadcast mode is disabled (the MISO drivers are re-enabled) upon an expiration of a timer (e.g., after a predetermined time has elapsed after the last SPI command transmitted via the SPI bus). The broadcast mode may be disabled in other ways, such as by using another pin, or upon an occurrence of an event, such as the toggling of the slave select pin of the SPI slave (e.g., from the active state to the inactive state and back to the active state).

Advantages of some embodiments include that the bandwidth of the SPI bus is increased as more SPI slaves can be programmed at the same time. Additional advantages include the capability to synchronize multiple SPI slaves using an SPI command (since all the SPI slaves receive the SPI command simultaneously). For example, in some embodiments, multiple devices (e.g., millimeter-wave radars) may be simultaneously enabled using the SPI broadcast mode to perform, e.g., beamforming functions, and other radar functions.

Figure 5:
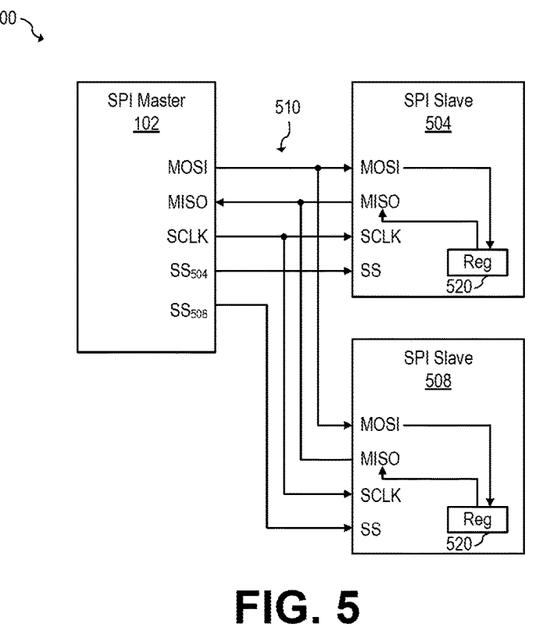
FIG. 5 shows a schematic diagram of a system, according to an embodiment of the present invention.

FIG. 5 shows a schematic diagram of system 500, according to an embodiment of the present invention. System 500 includes SPI master 102, SPI slaves 504 and 508, and SPI bus 510 coupled to SPI master 102 and to SPI slaves 504 and 508. System 500 may be, for example, a millimeter-wave radar system, in which the SPI master 102 is implemented in an application processor (not shown) and SPI slaves 504 and 508 are implemented in two millimeter-wave radars (not shown), respectively.

System 500 may implement method 400 for simultaneously writing to SPI slaves 504 and 508 using the MOSI line. For example, SPI broadcast mode may be enabled in each of SPI slaves 504 and 508 (step 402) by SPI master 102 first asserting $SS_{504}$ line and deasserting $SS_{508}$ line, issuing an SPI write command to write register 520 of SPI slave 504 via the MOSI line to enable the broadcast mode of SPI slave 504, then asserting $SS_{508}$ line and deasserting $SS_{504}$ line, and then issuing an SPI write command to write register 520 of SPI slave 508 via the MOSI line to enable the broadcast mode of SPI slave 508. Each of the SPI write commands to respective register 520 may be similar to the SPI command shown in FIG. 3.

Once broadcast mode is enabled for both SPI slaves 504 and 508, SPI master 102 can select both SPI slaves 504 and 5o8 to be simultaneously programmed (step 404) by asserting both $SS_{504}$ and $SS_{508}$ lines, and then issuing SPI write commands to program both SPI slaves 504 and 508 simultaneously. For example, FIG. 6 shows waveforms of the $SS_{504}$, $SS_{508}$, SCLK, MOSI and MISO lines of FIG. 5 during an SPI write command by SPI master 102 to SPI slaves 504 and 508 using SPI broadcast mode, according to an embodiment of the present invention.

Figure 6:
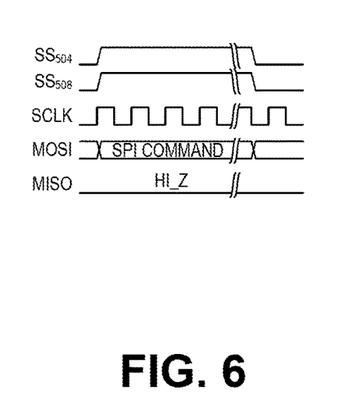
FIG. 6 shows waveforms of SS, SCLK, MOSI and MISO lines of FIG. 5 during an SPI write command by the SPI master of FIG. 5 to the SPI slaves of FIG. 5 using SPI broadcast mode, according to an embodiment of the present invention.

As shown in FIG. 6, during the SPI write command, the MISO line is in high impedance (HI_Z) since the MISO drivers of each of SPI slaves 504 and 5o8 are disabled (since the broadcast mode is enabled in each of SPI slaves 504 and 508). In some embodiments, the MISO line may be pulled low during SPI broadcast mode. In other embodiments, the MISO line may be pulled high during SPI broadcast mode. In yet other embodiments, the MISO line may be left floating during SPI broadcast mode.

SPI broadcast mode can be disabled (step 406) by issuing an SPI write command to register 520 via the MOSI line. For example, in some embodiments, disabling the SPI broadcast mode takes effect on the next SPI transaction. In such embodiments, the SPI broadcast mode can be disabled by simultaneously writing to all SPI slaves using the SPI broadcast mode.

Although FIG. 5 illustrates a non-limiting implementation of method 400 with 2 SPI slaves, it is understood that some embodiments may implemented method 400 with more than 2 SPI slaves, such as 4, 5, 10, or more. It is also understood that the SPI master may enable the SPI broadcast mode on a sub-set of all SPI slaves that are coupled to the SPI bus. For example, in an SPI bus that is coupled to 11 SPI slaves, an SPI master may configure 3 selected SPI slaves in SPI broadcast mode and simultaneously write to the 3 selected SPI slaves while keeping the other SPI slaves unselected (by keeping their respective SS pins deasserted).

Figure 7:
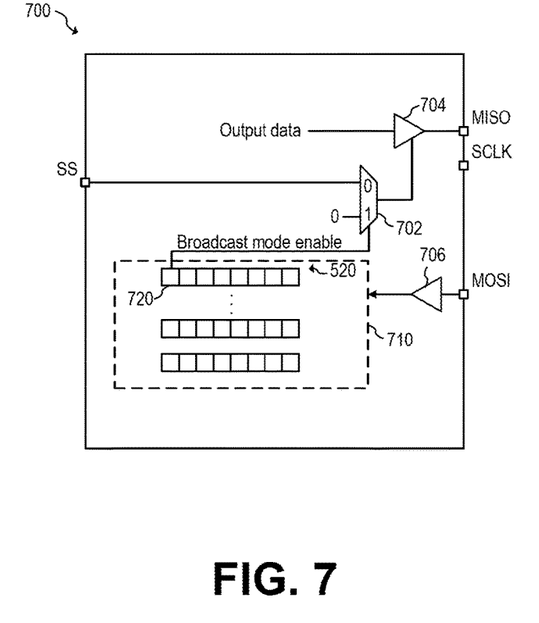
FIG. 7 shows a schematic diagram of a portion of an SPI slave, according to an embodiment of the present invention.

FIG. 7 shows a schematic diagram of a portion of SPI slave 700, according to an embodiment of the present invention. SPI slave 700 includes terminal MOSI, MISO, SS, and SCLK, MISO driver 704, MOSI driver 706, multiplexer (MUX) 702, and register bank 710. Register bank 710 includes register 520. Register 520 (which may be implemented, e.g., with a physical flip-flop per register bit) includes broadcast mode enable bit 720. In some embodiments, a pull-up resistor (not shown) is coupled to the output of MISO driver 704. In some embodiments, a pull-down transistor (not shown) is coupled to the output of MISO driver 704.

During normal operation, when SPI broadcast mode bit 720 is disabled (e.g., with a logic 0 in this example), MUX 702 couples the SS pin to an enable input of MISO driver 704. Therefore, when SS pin is deasserted (e.g., with a logic 0 in this example), MISO driver 704 is disabled, and when SS pin is asserted (e.g., with a logic 1 in this example), MISO driver 704 is enabled. When SPI broadcast mode bit 720 is disabled, each of the SPI write commands to write to any register of register bank 710 may be similar to the SPI command shown in FIG. 3.

When SPI broadcast mode bit 720 is enabled (e.g., with a logic 1 in this example), MUX 702 disables MISO drive 704 irrespective of the state of the SS pin. Therefore, when the SS pin is asserted, SPI slave 700 can receive SPI write commands via the MOSI pin and write any register of register bank 710 while having MISO driver 704 disabled. When SPI broadcast mode bit 720 is enabled, SPI write commands may be similar to the SPI command shown in FIG. 6. In some embodiments, when SPI broadcast mode bit 720 is enabled, MISO driver 704 is disabled even during SPI read commands. In such embodiments, SPI read commands do not transmit data over the MISO line. Therefore, if an SPI master accidentally uses SPI broadcast mode to read from a plurality of SPI slaves, no SPI bus error is generated.

In some embodiments, SPI broadcast mode can be advantageously achieved without redesigning the SPI state machine. For example, in some embodiments, the SPI state machine (not shown) of the SPI slave is implemented in a conventional manner, thereby generating output data each time an SPI write command is received, irrespective of whether SPI broadcast mode bit is enabled. However, when the SPI broadcast mode is enabled, the output data generated is not transmitted to the MISO line because MISO driver 704 is disabled.

Register bank 710 may be implemented in any way known in the art. It is understand that even though register bank 710 is illustrated in FIG. 7 as inside SPI slave 700, in some embodiments, register bank 710 may be implemented outside SPI slave 700.

Figure 8:
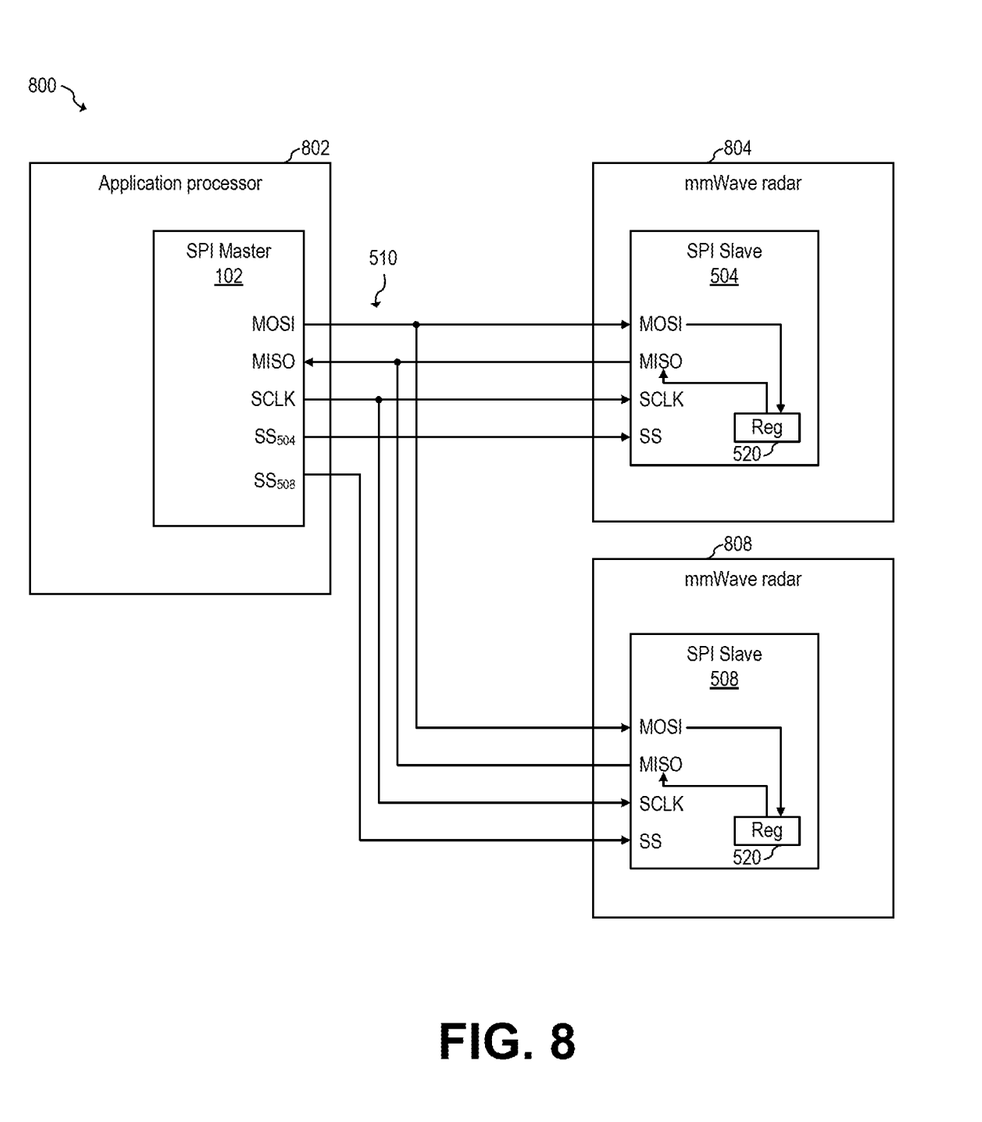
FIG. 8 shows a schematic diagram of a millimeter-wave radar system, according to an embodiment of the present invention.

The SPI masters and SPI slaves may be implemented in, e.g., integrated circuit, and may be part of devices such as millimeter-wave radars, micro-controllers, processors, or other devices. For example, FIG. 8 shows a schematic diagram of millimeter-wave radar system 800, according to an embodiment of the present invention. Millimeter-wave radar system 800 includes application processor 802, and millimeter-wave radars 804 and 808.

During normal operation, application processor 802 configures a set of parameters of millimeter-wave radars 804 and 808 via SPI bus 510 using the SPI broadcast mode (e.g., using method 400). For example, in some embodiments, application processor 802 configures, distances between chirps, duration of chirps, and other parameters using the broadcast mode.

In some embodiments, some configuration parameters may be unique to millimeter-wave radar 804, and some configuration parameters may be unique to millimeter-wave radar 808. In such embodiments, such unique configuration parameters may be programmed sequentially using SPI with SPI broadcast mode disabled.

In some embodiments, millimeter-wave radars 804 and 808 may be synchronized by sending a common trigger using SPI broadcast mode.

Application processor 802 may be implemented as a general purpose processor, controller or digital signal processor (DSP) that includes, for example, combinatorial circuits coupled to a memory. In some embodiments, application processor 802 may be implemented with an ARM architecture, for example. In some embodiments, Application processor 802 may be implemented as a custom application specific integrated circuit (ASIC). Other implementations are also possible.

Millimeter-wave radars 804 and 808 may be implemented in any way known in the art and may operate, for example, as an FMCW radar.

Figure 9:
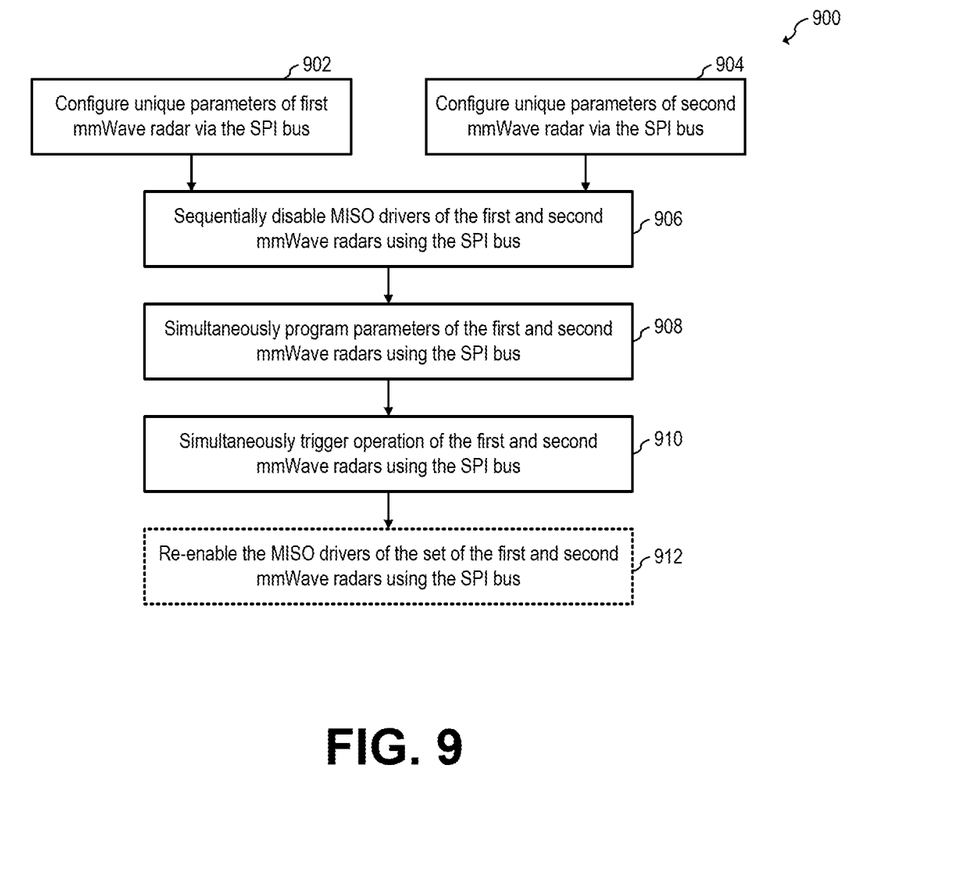
FIG. 9 shows a flow chart of an embodiment method for configuring and operating a plurality of millimeter-wave radars using an SPI bus, according to an embodiment of the present invention.

FIG. 9 shows a flow chart of embodiment method 900 for configuring and operating a plurality of millimeter-wave radars using an SPI bus, according to an embodiment of the present invention. Method 900 may be implemented, for example, by application processor 902 to configure and operate millimeter-wave radars 804 and 808.

During step 902, parameters that are custom to a first millimeter-wave radar (e.g., millimeter-wave radar 804) are configured using the SPI bus, without SPI broadcast mode. For example, a unique trigger delay assigned to millimeter-wave radar 804 may be programmed during step 902.

During step 904, parameters that are custom to a second millimeter-wave radar (e.g., millimeter-wave radar 808) are configured using the SPI bus (e.g., SPI bus 51o), without SPI broadcast mode. For example, a unique trigger delay assigned to millimeter-wave radar 808 may be programmed during step 902. If more than 2 millimeter-wave radars are coupled to the SPI bus (e.g., SPI bus 510), similar steps may be performed to configured them.

During step 906, the MISO drivers of each of the plurality of millimeter-wave radars connected to the SPI bus are sequentially disabled in a similar manner as described in step 402. In some embodiments, steps 902 and 906 may be combined. In some embodiments, steps 904 and 906 can be combined.

During step 908, all of the millimeter-wave radars coupled to the SPI bus are simultaneously programmed via the SPI bus using the SPI broadcast mode (e.g., in a similar manner as described in step 404) with parameters that are the same for all of the millimeter-wave radars. For example, in some embodiments, parameters such as the distance between chirps, duration of the chirps, frequency of the chirps, etc., are programmed simultaneously in this step. In some embodiments, multiple registers are programmed during this step, thereby advantageously saving programming time.

During step 910, and after all of the millimeter-wave radars have been custom programmed (step 906) and simultaneously programmed (step 908), operations of all of the millimeter-wave radars are triggered simultaneously by using the SPI broadcast mode (e.g., in a similar manner as described in step 404). Since each millimeter-wave radar has been programmed with a unique delay for starting operations during steps 902 and 904, transmissions of the chirps may be configured such that the transmission from each of the millimeter-wave radars do not overlap, thereby advantageously allowing, in some embodiments, for time-division multiplexing (TDM) of the plurality of millimeter-wave radars.

During step 912, the SPI broadcast mode may be optionally disabled in a similar manner as described in step 406.

Advantageous of some embodiments allow for synchronization of multiple devices, such as millimeter-wave radars, without using a dedicated pin of the devices.

Example embodiments of the present invention are summarized here. Other embodiments can also be understood from the entirety of the specification and the claims filed herein.

Example 1. A method for writing to a set of serial peripheral interface (SPI) slaves coupled to an SPI bus, the method including: disabling master in slave out (MISO) drivers of the set of SPI slaves using the SPI bus; after disabling the MISO drivers, setting respective slave selection terminals of the set of SPI slaves to an active state; and after setting the respective slave selection terminals of the set of SPI slaves to the active state, simultaneously writing data to the set of SPI slaves using a master out slave in (MOSI) line.

Example 2. The method of example 1, further including, after simultaneously writing data to the set of SPI slaves, enabling the MISO drivers of the set of SPI slaves.

Example 3. The method of one of examples 1 or 2, where enabling the MISO drivers of the set of SPI slaves includes enabling the MISO drivers of the set of SPI slaves by writing data to the set of SPI slaves using the MOSI line.

Example 4. The method of one of examples 1 or 2, where enabling the MISO drivers of the set of SPI slaves includes enabling the MISO drivers of the set of SPI slaves by toggling the respective slave selection lines of the set of SPI slaves to an inactive state and then to the active state.

Example 5. The method of one of examples 1 or 2, where enabling the MISO drivers of the set of SPI slaves includes enabling the MISO drivers of the set of SPI slaves when a respective timer of each of the set of SPI slaves expires.

Example 6. The method of one of examples 1 to 5, where disabling MISO drivers of the set of SPI slaves includes sequentially writing to each SPI slave of the set of SPI slaves using the MOSI line.

Example 7. The method of one of examples 1 to 6, where each respective SPI slave of the set of SPI slaves transmits data via the MISO line during the disabling of the respective MISO driver of the respective SPI slave.

Example 8. The method of one of examples 1 to 7, where disabling the MISO drivers of the set of SPI slaves includes setting respective SPI broadcast mode bits of each respective SPI slave of the set of SPI slaves to an active state.

Example 9. The method of one of examples 1 to 8, where each respective SPI slave of the set of SPI slaves includes a selection circuit that disables the respective MISO driver when the respective SPI broadcast mode bit is in the active state.

Example 10. The method of one of examples 1 to 9, where the selection circuit is a multiplexer that couples the respective slave selection terminal to an enable terminal of the respective MISO driver when the respective SPI broadcast mode bit is in an active state.

Example 11. A system including: a serial peripheral interface (SPI) bus including a master out slave in (MOSI) line, and a master in slave out (MISO) line; an SPI master including a MOSI terminal coupled to the MOSI line, a MISO terminal coupled to the MISO line, a first slave selection terminal, and a second slave selection terminal; a first SPI slave including a MOSI terminal coupled to the MOSI line, a MISO terminal coupled to the MISO line, a first MISO driver having an output coupled to the MISO terminal of the first SPI slave, and a first slave selection terminal coupled to the first slave selection terminal of the SPI master; and a second SPI slave including a MOSI terminal coupled to the MOSI line, a MISO terminal coupled to the MISO line, a second MISO driver having an output coupled to the MISO terminal of the second SPI slave, and a second slave selection terminal coupled to the second slave selection terminal of the SPI master, where the SPI master is configured to: disable the first and second MISO drivers using the SPI bus; after disabling the first and second MISO drivers, set the first and second slave selection terminals of the SPI master to an active state; and after setting the first and second slave selection terminals of the SPI master to an active state, simultaneously write data to the first and second SPI slaves using the MOSI line.

Example 12. The system of example ii, where the SPI master is further configured to enable the first and second MISO drivers after simultaneously writing data to the first and second SPI slaves.

Example 13. The system of one of examples 11 or 12, where the SPI master is configured to enable the first and second MISO drivers by using the SPI bus.

Example 14. The system of one of examples 11 to 13, where the SPI master is configured to disable the first and second MISO drivers by sequentially writing to the first and second SPI slaves using the MOSI line.

Example 15. The system of one of examples 11 to 14, where the first MISO driver includes a first enable terminal, where the second MISO driver includes a second enable terminal, where the first SPI slave further includes a first SPI broadcast bit and a first selection circuit configured to control the first enable terminal based on the first SPI broadcast bit, and where the second SPI slave further includes a second SPI broadcast bit and a second selection circuit configured to control the second enable terminal based on the second SPI broadcast bit.

Example 16. The system of one of examples 11 to 15, where the first selection circuit is configured to couple the first slave selection terminal to the first enable terminal when the first SPI broadcast bit is in an inactive state, and to disable the first MISO driver when the first SPI broadcast bit is in an active state, and where the second selection circuit is configured to couple the second slave selection terminal to the second enable terminal when the second SPI broadcast bit is in an inactive state, and to disable the second MISO driver when the second SPI broadcast bit is in an active state.

Example 17. The system of one of examples 11 to 16, where the first selection circuit is a first multiplexer having a first input coupled to the first slave selection terminal, a selection input coupled to the first SPI broadcast bit, and an output coupled to the first enable terminal, and where the second selection circuit is a second multiplexer having a first input coupled to the second slave selection terminal, a selection input coupled to the second SPI broadcast bit, and an output coupled to the second enable terminal.

Example 18. A system including: a serial peripheral interface (SPI) bus including a master out slave in (MOSI) line, and a master in slave out (MISO) line; an application processor having an SPI master including a MOSI terminal coupled to the MOSI line, a MISO terminal coupled to the MISO line, a first slave selection terminal, and a second slave selection terminal; a first device having a first register bank and a first SPI slave including a MOSI terminal coupled to the MOSI line, a MISO terminal coupled to the MISO line, a first MISO driver having an output coupled to the MISO terminal of the first SPI slave, and a first slave selection terminal coupled to the first slave selection terminal of the SPI master; and a second device having a second register bank and a second SPI slave including a MOSI terminal coupled to the MOSI line, a MISO terminal coupled to the MISO line, a second MISO driver having an output coupled to the MISO terminal of the second SPI slave, and a second slave selection terminal coupled to the second slave selection terminal of the SPI master, where the application processor is configured to: disable the first and second MISO drivers using the SPI master, after disabling the first and second MISO drivers, set the first and second slave selection terminals of the SPI master to an active state, and after setting the first and second slave selection terminals of the SPI master to an active state, simultaneously write data to the first and second register banks via the SPI bus using the SPI master.

Example 19. The system of example 18, where the application processor is further configured to program the first and second devices by sequentially writing to the first and second register banks using the SPI bus before disabling the first and second MISO drivers.

Example 20. The system of one of examples 18 or 19, where the first device is a first millimeter-wave radar, and the second device is a second millimeter-wave radar.

Example 21. The system of one of examples 18 to 20, where the application processor is configured to simultaneously trigger radar operations of the first and second millimeter-wave radars via the SPI bus using the SPI master.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for writing to a set of serial peripheral interface (SPI) slaves coupled to an SPI bus, the method comprising:
    disabling master in slave out (MISO) drivers of the set of SPI slaves using the SPI bus;
    after disabling the MISO drivers, setting respective slave selection terminals of the set of SPI slaves to an active state while keeping the MISO drivers of the set of SPI slaves disabled; and
    after setting the respective slave selection terminals of the set of SPI slaves to the active state, simultaneously writing data to the set of SPI slaves using a master out slave in (MOSI) line.

2. The method of claim 1, further comprising, after simultaneously writing data to the set of SPI slaves, enabling the MISO drivers of the set of SPI slaves.

3. The method of claim 2, wherein enabling the MISO drivers of the set of SPI slaves comprises enabling the MISO drivers of the set of SPI slaves by writing data to the set of SPI slaves using the MOSI line.

4. The method of claim 2, wherein enabling the MISO drivers of the set of SPI slaves comprises enabling the MISO drivers of the set of SPI slaves by toggling the respective slave selection lines of the set of SPI slaves to an inactive state and then to the active state.

5. The method of claim 2, wherein enabling the MISO drivers of the set of SPI slaves comprises enabling the MISO drivers of the set of SPI slaves when a respective timer of each of the set of SPI slaves expires.

6. The method of claim 1, wherein disabling MISO drivers of the set of SPI slaves comprises sequentially writing to each SPI slave of the set of SPI slaves using the MOSI line.

7. The method of claim 6, wherein each respective SPI slave of the set of SPI slaves transmits data via the MISO line during the disabling of the respective MISO driver of the respective SPI slave.

8. The method of claim 1, wherein disabling the MISO drivers of the set of SPI slaves comprises setting respective SPI broadcast mode bits of each respective SPI slave of the set of SPI slaves to an active state.

9. The method of claim 8, wherein each respective SPI slave of the set of SPI slaves comprises a selection circuit that disables the respective MISO driver when the respective SPI broadcast mode bit is in the active state.

10. The method of claim 9, wherein the selection circuit is a multiplexer that couples the respective slave selection terminal to an enable terminal of the respective MISO driver when the respective SPI broadcast mode bit is in an active state.

11. A system comprising:
a serial peripheral interface (SPI) bus comprising a master out slave in (MOSI) line, and a master in slave out (MISO) line;
an SPI master comprising a MOSI terminal coupled to the MOSI line, a MISO terminal coupled to the MISO line, a first slave selection terminal, and a second slave selection terminal;
a first SPI slave comprising a MOSI terminal coupled to the MOSI line, a MISO terminal coupled to the MISO line, a first MISO driver having an output coupled to the MISO terminal of the first SPI slave, and a first slave selection terminal coupled to the first slave selection terminal of the SPI master; and
a second SPI slave comprising a MOSI terminal coupled to the MOSI line, a MISO terminal coupled to the MISO line, a second MISO driver having an output coupled to the MISO terminal of the second SPI slave, and a second slave selection terminal coupled to the second slave selection terminal of the SPI master, wherein the SPI master is configured to:
disable the first and second MISO drivers using the SPI bus;
after disabling the first and second MISO drivers, set the first and second slave selection terminals of the SPI master to an active state while keeping the first and second MISO drivers disabled; and
after setting the first and second slave selection terminals of the SPI master to an active state, simultaneously write data to the first and second SPI slaves using the MOSI line.

12. The system of claim 11, wherein the SPI master is further configured to enable the first and second MISO drivers after simultaneously writing data to the first and second SPI slaves.

13. The system of claim 12, wherein the SPI master is configured to enable the first and second MISO drivers by using the SPI bus.

14. The system of claim 11, wherein the SPI master is configured to disable the first and second MISO drivers by sequentially writing to the first and second SPI slaves using the MOSI line.

15. The system of claim 11, wherein the first MISO driver comprises a first enable terminal, wherein the second MISO driver comprises a second enable terminal, wherein the first SPI slave further comprises a first SPI broadcast bit and a first selection circuit configured to control the first enable terminal based on the first SPI broadcast bit, and wherein the second SPI slave further comprises a second SPI broadcast bit and a second selection circuit configured to control the second enable terminal based on the second SPI broadcast bit.

16. The system of claim 15, wherein the first selection circuit is configured to couple the first slave selection terminal to the first enable terminal when the first SPI broadcast bit is in an inactive state, and to disable the first MISO driver when the first SPI broadcast bit is in an active state, and wherein the second selection circuit is configured to couple the second slave selection terminal to the second enable terminal when the second SPI broadcast bit is in an inactive state, and to disable the second MISO driver when the second SPI broadcast bit is in an active state.

17. The system of claim 16, wherein the first selection circuit is a first multiplexer having a first input coupled to the first slave selection terminal, a selection input coupled to the first SPI broadcast bit, and an output coupled to the first enable terminal, and wherein the second selection circuit is a second multiplexer having a first input coupled to the second slave selection terminal, a selection input coupled to the second SPI broadcast bit, and an output coupled to the second enable terminal.

18. A system comprising:
a serial peripheral interface (SPI) bus comprising a master out slave in (MOSI) line, and a master in slave out (MISO) line;
an application processor having an SPI master comprising a MOSI terminal coupled to the MOSI line, a MISO terminal coupled to the MISO line, a first slave selection terminal, and a second slave selection terminal;
a first device having a first register bank and a first SPI slave comprising a MOSI terminal coupled to the MOSI line, a MISO terminal coupled to the MISO line, a first MISO driver having an output coupled to the MISO terminal of the first SPI slave, and a first slave selection terminal coupled to the first slave selection terminal of the SPI master; and
a second device having a second register bank and a second SPI slave comprising a MOSI terminal coupled to the MOSI line, a MISO terminal coupled to the MISO line, a second MISO driver having an output coupled to the MISO terminal of the second SPI slave, and a second slave selection terminal coupled to the second slave selection terminal of the SPI master, wherein the application processor is configured to:
disable the first and second MISO drivers using the SPI master,
after disabling the first and second MISO drivers, set the first and second slave selection terminals of the SPI master to an active state while keeping the first and second MISO drivers disabled, and
after setting the first and second slave selection terminals of the SPI master to an active state, simultaneously write data to the first and second register banks via the SPI bus using the SPI master.

19. The system of claim 18, wherein the application processor is further configured to program the first and second devices by sequentially writing to the first and second register banks using the SPI bus before disabling the first and second MISO drivers.

20. The system of claim 18, wherein the first device is a first millimeter-wave radar, and the second device is a second millimeter-wave radar.

21. The system of claim 20, wherein the application processor is configured to simultaneously trigger radar operations of the first and second millimeter-wave radars via the SPI bus using the SPI master.

22. The system of claim 11, wherein disabling the first and second MISO drivers using the SPI bus comprises sequentially disabling the first and second MISO drivers using an SPI write command via the MOSI line.

23. The system of claim 18, wherein disabling the first and second MISO drivers using the SPI bus comprises sequentially asserting the first and second slave selection terminals, and writing an SPI broadcast bit using an SPI write command via the MOSI line.

* * * * *